(12) United States Patent
Lietaer

(10) Patent No.: US 10,272,440 B2
(45) Date of Patent: Apr. 30, 2019

(54) SHREDDING SYSTEM

(71) Applicant: Feltron nv, Otegem (BE)

(72) Inventor: Frederic Lietaer, Otegem (BE)

(73) Assignee: Feltron nv, Otegem (BE)

( * ) Notice: Subject to any disclaimer, the term of this patent is extended or adjusted under 35 U.S.C. 154(b) by 889 days.

(21) Appl. No.: 14/190,444

(22) Filed: Feb. 26, 2014

(65) Prior Publication Data

US 2015/0238971 A1    Aug. 27, 2015

(51) Int. Cl.
| | | |
|---|---|---|
| *B02C 18/00* | (2006.01) | |
| *B02C 18/22* | (2006.01) | |
| *A01G 3/00* | (2006.01) | |
| *B02C 18/14* | (2006.01) | |
| *B02C 18/18* | (2006.01) | |
| *B02C 18/16* | (2006.01) | |

(52) U.S. Cl.
CPC .......... *B02C 18/2216* (2013.01); *A01G 3/002* (2013.01); *B02C 18/141* (2013.01); *B02C 18/146* (2013.01); *B02C 18/184* (2013.01); *B02C 2018/162* (2013.01)

(58) Field of Classification Search
CPC ... B02C 18/14; B02C 18/0084; B02C 18/066; B02C 18/2216; B02C 18/184; B02C 13/06; B02C 13/09; B02C 13/10
USPC ...................... 241/57, 101.763, 56
See application file for complete search history.

(56) References Cited

U.S. PATENT DOCUMENTS

| | | | | |
|---|---|---|---|---|
| 289,365 A | * | 11/1883 | White .................. | B02C 18/0007 241/225 |
| 2,122,658 A | * | 7/1938 | Preston ................... | B02C 13/26 198/493 |
| 2,136,214 A | * | 11/1938 | Virgil ................. | B61D 27/0081 198/640 |
| 2,530,313 A | * | 11/1950 | Parten ................... | B02C 13/286 241/185.5 |
| 2,552,037 A | * | 5/1951 | Elverum ................... | B02C 9/00 241/242 |
| 2,699,898 A | * | 1/1955 | Rogers .................... | B02C 13/22 241/154 |
| 3,157,366 A | * | 11/1964 | Rogers ................ | B02C 13/2804 241/188.1 |
| 3,235,189 A | * | 2/1966 | Rogers .................... | B02C 13/04 241/188.1 |
| 3,313,494 A | * | 4/1967 | Peterson ................. | B02C 13/08 241/56 |
| 3,348,594 A | * | 10/1967 | Hoch ...................... | A01F 29/06 241/101.5 |
| 3,856,218 A | * | 12/1974 | Harmon .............. | B02C 18/0084 241/101.76 |

(Continued)

FOREIGN PATENT DOCUMENTS

EP        0785026 A1    7/1997

*Primary Examiner* — Faye Francis
(74) *Attorney, Agent, or Firm* — James Creighton Wray; Meera P. Narasimhan

(57) ABSTRACT

A shredder (1) is provided for comminuting organic material to form shreds. The shredder has a shredding chamber (2) provided with rotatable cutting devices (3), wherein the shredder (1) furthermore includes a fan chamber (6) containing a fan (7) which is connected to the shredding chamber (2) via a passage (4), wherein the fan (7) is configured to generate a suction force which will suck the shreds out of the shredding chamber via the passage and will remove these from the fan chamber (6) via a discharge opening (8). In contrast to the known shredders, this shredder (1) no longer has a discharge opening in the shredding chamber and, in addition, no longer requires a calibration grille.

11 Claims, 5 Drawing Sheets

(56) References Cited

U.S. PATENT DOCUMENTS

| | | | | |
|---|---|---|---|---|
| 3,873,034 A * | 3/1975 | Iwahori | ............... | D21B 1/12 241/55 |
| 3,902,672 A * | 9/1975 | Ginaven | ............ | B02C 13/02 241/56 |
| 4,161,294 A * | 7/1979 | Lautenschlager | ...... | B02C 13/08 241/191 |
| 4,545,727 A * | 10/1985 | Beelmann | ........... | B02C 13/08 241/56 |
| 4,657,192 A * | 4/1987 | Browning | ......... | B02C 18/0007 241/224 |
| 4,875,630 A | 10/1989 | Carlson | | |
| 5,240,188 A | 8/1993 | Whitmire | | |
| 5,564,635 A * | 10/1996 | Terada | ............... | D21B 1/08 241/162 |
| 5,878,970 A * | 3/1999 | Leeb | ............... | A01F 29/095 241/294 |
| 6,082,644 A * | 7/2000 | Turner | ............... | B02C 18/14 241/260 |
| 7,213,781 B2 * | 5/2007 | Pakura | ............. | A01D 43/08 241/221 |
| 8,146,849 B2 * | 4/2012 | Bacon | ............. | A01F 29/095 241/242 |
| 8,602,334 B2 * | 12/2013 | Svoboda | ............ | A01G 1/125 241/100 |
| 8,733,681 B2 * | 5/2014 | Pallmann | .......... | B02C 18/2216 241/242 |
| 9,192,938 B2 * | 11/2015 | Grover | ............. | B02C 18/0084 |
| 2011/0186664 A1 * | 8/2011 | Lucas | ............... | B02C 13/00 241/38 |

\* cited by examiner

SHREDDING SYSTEM

The present invention relates to a shredder for comminuting organic material to form shreds, comprising one introduction funnel for supplying organic material, a shredding chamber provided with rotatable cutting means for shredding the supplied organic material and a fan chamber containing a fan which is connected to the shredding chamber via a passage, wherein the fan is configured to generate a suction force which will suck the shreds out of the shredding chamber via the passage and will remove these from the fan chamber via a discharge opening. The present invention relates in particular to a green waste shredder for shredding garden waste, prunings, flowers, branches, leaves, agricultural crops, foliage, etc.

Shredders are used to shred (cut) trimmings, such as prunings, branches, leaves, agricultural crops, foliage, etc. originating from nature and landscape management or agriculture. Many different systems are already known for shredding organic material. Following shredding, the shreds leave the shredding chamber via the discharge side.

A first known system is the impact shredder, in which a number of cutting blades are fitted on the face of a large disc against which the organic material is pressed during introduction in an introduction funnel, optionally via feed rollers, and is transversely cut between the cutting blades and a counterblade.

A second known system is the corkscrew shredder, in which a number of cutting blades are fitted in the longitudinal direction of a drum wall. The organic material is pressed against the drum wall, as a result of which said material is transversely cut between the cutting blades and a counterblade.

With the abovementioned (first) group of systems, shreds of fixed sizes are produced directly as soon as the organic material comes into contact with the cutting blades. Such shredders have the drawback that they are only suitable for shredding branches and are not very resistant to foreign objects, such as for example pebbles, sand, etc. In addition, these systems become clogged quite easily, as a result of which they are less suitable for processing moisture-rich organic material.

In order to be able to process not only branches, but other waste, such as garden waste, flowers, leaves, agricultural crops, foliage and the like as well, use is currently made of a second group of systems, which may either be a hammer or clapper system, wherein the organic material is comminuted by means of clappers or hammers, or the shredder which is described, inter alia, in European patent EP 1 480 752, which uses an anvil and group of cutting blades fitted on a shaft which are rotatably arranged in front of the anvil.

With the second group of systems which are suitable for processing mainly green waste, the discharge side of the shredding chamber is provided with a grille with passage openings for calibrating the shreds, a so-called calibration grille. In this way, only the shreds which have been comminuted to a suitable size by the action of the cutting means can leave the device. With this group, contrary to the first group, the shreds are not formed immediately. The shreds are formed in two stages, as it were. First, a 'large' irregular piece is produced which is subsequently comminuted in the shredding chamber to the desired size. The calibration grille determines how long the shreds remain inside the shredding chamber. A drawback of the second group of systems is that the grille apertures of the calibration grille easily become clogged, as a result of which these systems are also less suitable for processing moist material. Furthermore, the calibration grille forms an obstacle during the discharge of the shredded material, as a result of which a part of the available capacity is lost.

Furthermore, as described in U.S. Pat. No. 4,875,630, it is known to provide a shredder with a fan in order to either suck up soft organic material, such as for example leaves and twigs, following which it is comminuted by means of loosely suspended cutting elements in order to prevent damage to the shredder as a result of sucked-up pebbles and/or hard objects, or, as described in U.S. Pat. No. 5,240,188, to displace the material supplied, in particular leaves and relatively small branches (diameter±2.5 cm), between the introduction and discharge opening, in which case the material supplied is comminuted by means of rotatable flinger bars during this displacement. In order to prevent blockage, guide rods are provided, inter alia between said flinger bars. The devices described in U.S. Pat. Nos. 4,875,630 and 5,240,188 inter alia have the drawback that they are limited to leaves. However, U.S. Pat. No. 5,240,188 describes an embodiment which also allows relatively small branches (up to 2.5 cm) to be processed. In this case, shredding is carried out in two stages, with the supplied material in a first step being comminuted by two cutting blade shafts which are rotatable in opposite directions, before the material comes into contact with the rotatable flinger bars or clappers. According to this publication, it is furthermore possible to process relatively large branches (up to 10 cm diameter) via an alternative inlet on a separate, third shredding module. However, such a shredder is complicated and expensive. In addition, the trimmings have to be presorted.

SUMMARY OF THE INVENTION

It is now an object of the present invention to provide a shredder which is suitable in particular to process substantially green waste, and to process this material which not only comprises small, soft or moist organic material (diameter<2.5 cm), but also hard and relatively thick (diameter from 2.5 cm to 15 cm and larger) organic material, in which the presence of a calibration grille is no longer required in order to comminute the shreds to the required size due to the fact that the calibration will be carried out in an alternative manner.

The object of the invention is achieved by providing a shredder for comminuting organic material to form shreds, comprising one introduction funnel for supplying organic material, a shredding chamber provided with rotatable cutting means for shredding the supplied organic material and a fan chamber containing a fan which is connected to the shredding chamber via a passage, wherein the fan is configured to generate a suction force which will suck the shreds out of the shredding chamber via the passage and will remove these from the fan chamber via a discharge opening, in which the cutting means comprise at least two cutting blade groups which are fitted next to one another on a shaft and rotatably arranged in front of an anvil, wherein said cutting blade groups each comprise several splitting blades which are intended for splitting supplied organic material substantially along the direction of introduction of the material. Preferably, the shredder has at most one introduction funnel which is suitable for manually supplying organic material.

In contrast to the known shredders, the shredder according to the present invention no longer has a direct discharge opening to the environment in the shredding chamber, as a result of which the shreds formed cannot leave the device until they have passed through the fan chamber. In addition, no calibration grille is provided. The calibration of the shreds mainly takes place in the shredding chamber. The shredder according to the present invention comprises a number of technical concepts in order to increase the residence time of the shreds in the shredding chamber and thus to control the calibration thereof. To this end, the shreds have to remain in the shredding chamber for a sufficiently long period of time. In order to increase the residence time of the shreds in the shredding chamber, a passage is provided which is situated centrally between the shredding chamber and fan chamber. In addition to the presence of said passage, which results in the formation of two different chambers, as it were, and in which a constriction is situated at the transition between the two chambers, the device, in a number of preferred embodiments, comprises obstruction means which are configured to counteract the shred-conveying airflow between the two different chambers in order to increase the residence time of the shreds in the shredding chamber.

In a preferred embodiment of the shredder according to the invention, the size of the passage is adjustable and/or the shape of the passage is adjustable. By varying the size and/or shape of the passage, it is also possible to vary the residence time in the shredding chamber. The size and/or shape of the passage can be adjusted by fitting specific inserts or by providing adjustable movable segments which are configured to make the passage opening larger or smaller. According to a more preferred embodiment of the shredder according to the invention, the centre of the passage is situated on the shaft of the cutting blade groups.

The suction force generated by the fan will always move the shreds in the shredding chamber in the direction of the passage. In order to achieve a good calibration, it is important for the shreds to remain in the shredding chamber for a sufficiently long period of time. To this end, a counterforce is generated in the shredder according to the invention which acts counter to the suction force and ensures that the shreds remain in the shredding chamber for longer and thus have a greater chance of being cut. According to a more preferred embodiment of the shredder according to the invention, to this end the cutting face of a number of splitting blades has a bevel which is positioned in such a manner that, in use, the shreds formed are projected in a direction away from the passage. By selecting the number of these counteracting bevels, it is possible to influence the calibration.

In a particular embodiment of the shredder according to the invention, the splitting blades within one cutting blade group are fitted on the shaft in a manner offset with respect to each other, so that the projections of their cutting faces on the anvil do not coincide and cover the entire introduction width.

In a more particular embodiment of the shredder according to the invention, the splitting blades of cutting blade groups which have been fitted next to one another are situated offset opposite one another, so that each of these acts on the supplied organic material at a different point in time. Due to the fact that the cutting blades are offset with respect to one another, a rotating labyrinth is created in use, as it were, between which the shreds have to move in order to reach the passage. This also increases the residence time of the shreds in the shredding chamber and the frequency with which they come into contact with a cutting blade.

In a most particular embodiment of the shredder according to the invention, the splitting blades furthermore comprise a back face which is intended to slow down the speed of introduction of organic material into the shredding chamber.

According to an advantageous embodiment of the shredder according to the invention, the casing of the shredding chamber comprises one or more guide elements which are configured to guide the shreds which have been centrifugally hurled away back in the direction of the cutting means. Such an embodiment prevents the shreds in the narrow boundary zone, outside the reach of the cutting means, from moving in the direction of the passage.

According to a more advantageous embodiment of the shredder according to the invention, the casing of the shredding chamber comprises one or more hook-shaped restraining elements which are configured to slow down fibre strands. These restraining elements are positioned in such a manner that they are situated outside the cutting zone of the cutting blades so that no contact is possible between the cutting blades and said restraining elements. These restraining elements will slow down fibrous material, so that this can be cut completely and can no longer be wound around the cutting blade shaft.

In a preferred embodiment of the shredder according to the invention, the fan comprises a number of blades fitted on a shaft, in which one or more blades are provided with cutting elements so as to provide a supplementary cutting of the sucked-in shreds.

According to a particularly preferred embodiment of the shredder according to the invention, the fan comprises two vane-shaped blades which are configured to clean the casing surface of the fan chamber.

In order to further explain the properties of the present invention and to indicate additional advantages and features thereof, a more detailed description of the shredder according to the invention is now given below. It will be clear that nothing in the following description can be interpreted as a limitation of the protection laid down in the claims.

BRIEF DESCRIPTION OF THE DRAWINGS

In this description, reference numerals are used to refer to the attached drawings, in which.

DETAILED DESCRIPTION

Figure 1:
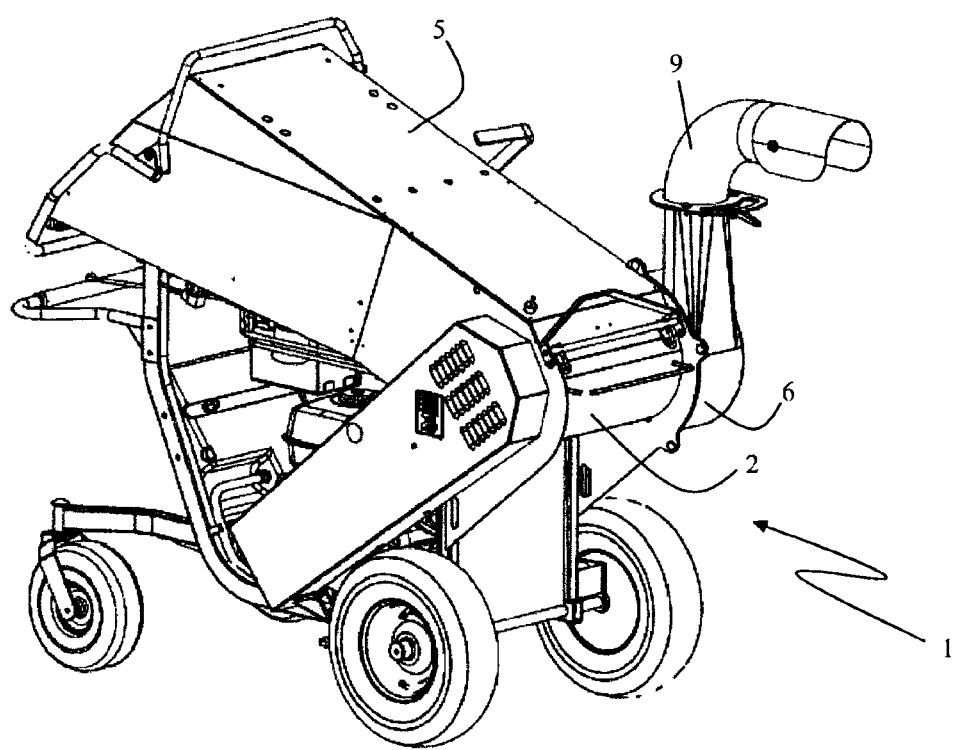
FIG. 1 shows a perspective view of the shredder according to the invention.
Figure 2:
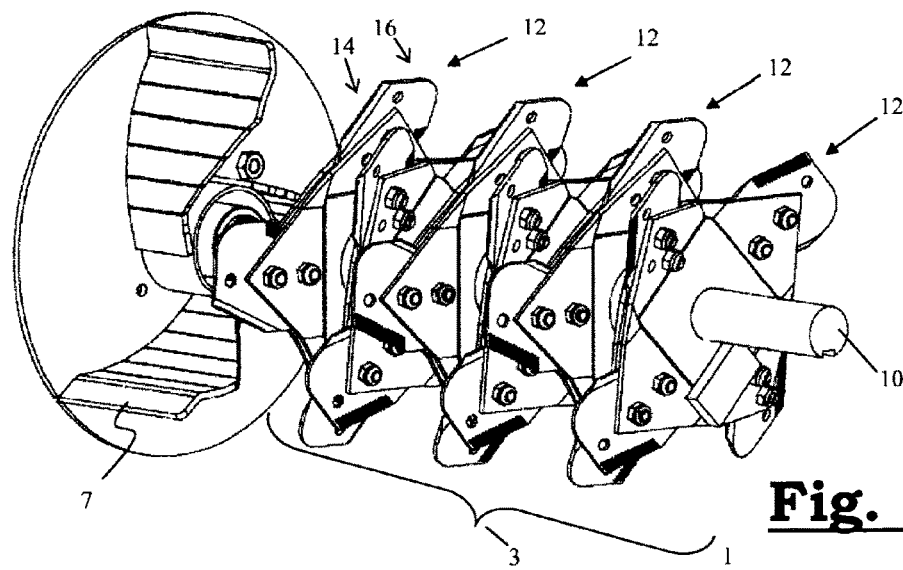
FIG. 2 shows a detail view of a rotor provided with a number of cutting blade groups situated next to each other and a fan.

The shredder (1) according to the present invention and as illustrated in FIG. 1 comprises a shredding chamber (2)

provided with rotatable cutting means (3) for shredding the organic material and an introduction funnel (5) configured to introduce the organic material into the shredding chamber (2). The introduction funnel (5) extends along a direction at right angles to the shaft (10) of the rotatable cutting means (3). The shredder according to the present invention has at most one introduction funnel (5) suitable for manually supplying organic material. However, it is evident that the introduction funnel (5) may also be filled mechanically, for example by means of a clamshell crane.

The material to be shredded is supplied via the introduction opening of the introduction funnel (5) and the introduction funnel (5) is connected to the shredding chamber (2) where the supplied material is then cut into shreds by means of rotatable cutting means (3). As soon as the material to be shredded comes into contact with the cutting means (3), this material is automatically pulled in due to the rotation of the cutting means (3).

Figure 3:
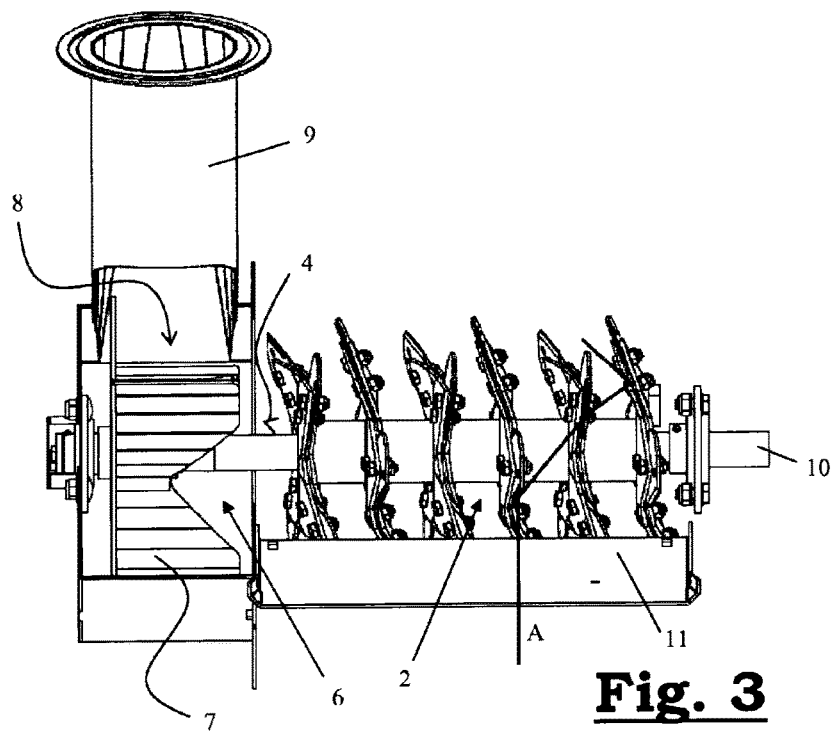
FIG. 3 shows a cross section of the shredder according to the invention, indicating a possible path (A) which shreds partly travel in the shredding chamber.

As can inter alia be seen in FIG. 3, the cutting means (3) preferably comprise a rotor (10) which is set at right angles to the direction of introduction and is composed of a shaft onto the periphery of which at least two adjacent cutting blade groups (12) are fixedly fitted which are rotatably arranged in front of an anvil (11), in which said cutting blade groups (12) each comprise several fixed splitting blades which are intended for splitting the supplied material substantially according to the direction of introduction of the material. In a specific embodiment, the cutting blade groups (12) may furthermore be provided with at least one chopping blade which is intended to cut up the supplied organic material substantially at right angles to the direction of introduction of the material. The rotor (10) rotates in a housing.

With the known devices, the shredding chamber has a discharge opening in which a calibration screen (grille) is arranged, via which the shredded material is discharged. The calibration screen ensures that the material remains inside the shredding chamber, so that it can be cut further to form smaller particles. In other words, with the known systems, the size of the shreds is determined by the calibration screen which only allows through those shreds which fit through the openings of the screen. The shreds are forced through the screen by the cutting means and the generated centrifugal force and then fall onto the floor as a result of the effects of the force of gravity.

According to the present invention, the presence of a calibration screen (grille) is now no longer required in order to comminute the shreds to the appropriate size. To this end, the shredder (1) comprises a separate fan chamber (6) next to the shredding chamber. The fan chamber contains a rotatable fan (7). In order to allow the fan (7) to rotate, the fan (7) is also fitted on the same shaft (10) as that on which the cutting blade groups (12) are arranged. Via a passage (4) (port), the centre of which is also situated on the same shaft (10), the fan chamber (6) is connected to the shredding chamber (2). The fan (7) is configured to generate a suction force which is sufficient to suck the shreds from the shredding chamber (2) via the passage (4) and remove these from the fan chamber (6) via a discharge opening (8). The shredded material which is removed via the discharge opening (8) then ends up in a discharge pipe (9) via which it leaves the shredder.

Figure 6:
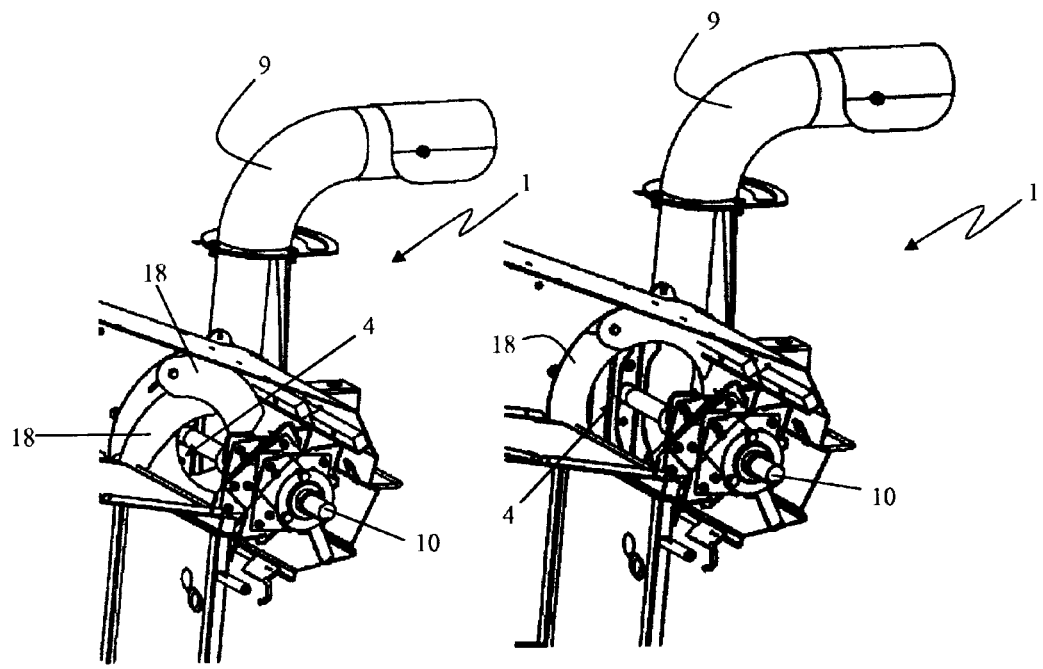
FIG. 6 shows the adjustable passage opening, in which FIG. 6.1 shows a shredder having a passage opening which is smaller than the passage opening of the shredder illustrated in FIG. 6.2.

In the shredder according to the invention, the calibration of the shreds is determined by the time period for which the shreds remain in the shredding chamber (2) before being discharged. By varying the size and/or shape of the passage, it is also possible to vary the residence time in the shredding chamber. The size and/or shape of the passage can be adjusted by inserting specific inserts or movable segments (18). This can clearly be seen in FIG. 6, which shows that the size of the passage between the shredding chamber and fan chamber can be adjusted. Thus, the position of the segments (18) can be moved along a, for example, circular path via an adjusting means, such as for example a handle, resulting in a decrease (see FIG. 6.1) or an increase (see FIG. 6.2) in the size of the passage opening. When the size of the passage opening is reduced, the flow of the shreds towards the fan chamber will be impeded, as a result of which the shreds remain in the shredding chamber for longer, so that they are cut more often.

The suction force generated by the fan (7) will always pull shreds in the shredding chamber (2) towards the passage (4). In order to achieve good calibration, it is necessary to produce a counterforce which ensures that this flow of shreds in the direction of the passage (4) is counteracted, so that the shreds remain in the shredding chamber (2) for longer and thus have more chance of being cut by the cutting means (3).

The abovementioned flow of shreds can be counteracted by providing obstruction means, as it were. This may be achieved, for example, by providing the cutting face (14) of the cutting blades (13) with a specific bevel. The bevel of the cutting blades (13) ensures that, as soon as a shred come into contact with the cutting blades, it bounces off in a certain direction, as can be seen in FIG. 3 (see line A). The direction of this bouncing off of the shreds has to be as far away as possible from the direction towards the passage (4). The choice of the number of cutting faces which have such a bevel will determine the calibration; preferably at least 50% of the cutting faces present has a bevel which is positioned in such a manner that, in use, the shreds formed are flung in a direction away from the passage. Furthermore, the bevel of the cutting face (14) of the cutting blades which are arranged obliquely also has to ensure that the shreds are forced as much as possible towards the axis of the cutting blade shaft and not radially outwards, away from the cutting blades. Due to the centrifugal force, the shreds are forced to the periphery anyway and end up in a peripheral region surrounding the cutting blades, outside of their cutting range. This has to be prevented.

Figure 7:
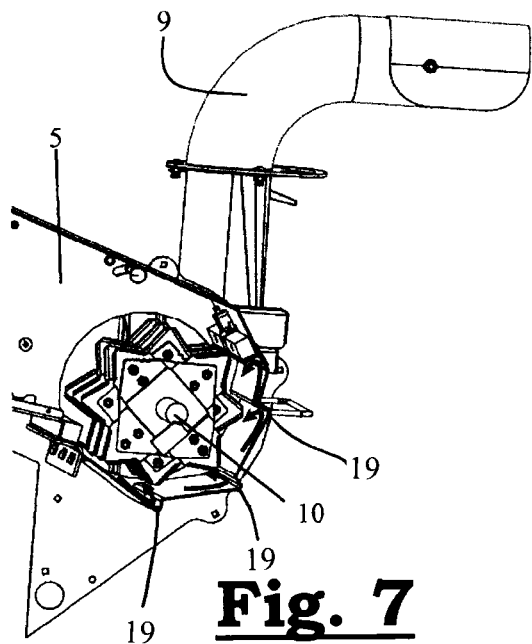
FIG. 7 shows a longitudinal section of the shredding chamber, in which an example according to the invention can be seen of the guide elements on the casing surface.

In order to prevent the shreds from moving outside of the cutting range of the cutting means, in the direction of the passage (4), the casing of the shredding chamber (2) may be provided with guide elements (19), as shown in FIG. 7, which are suitable for continuously guiding the shreds in the direction of the cutting means (3), thus increasing the chance of additional cutting.

Figure 8:
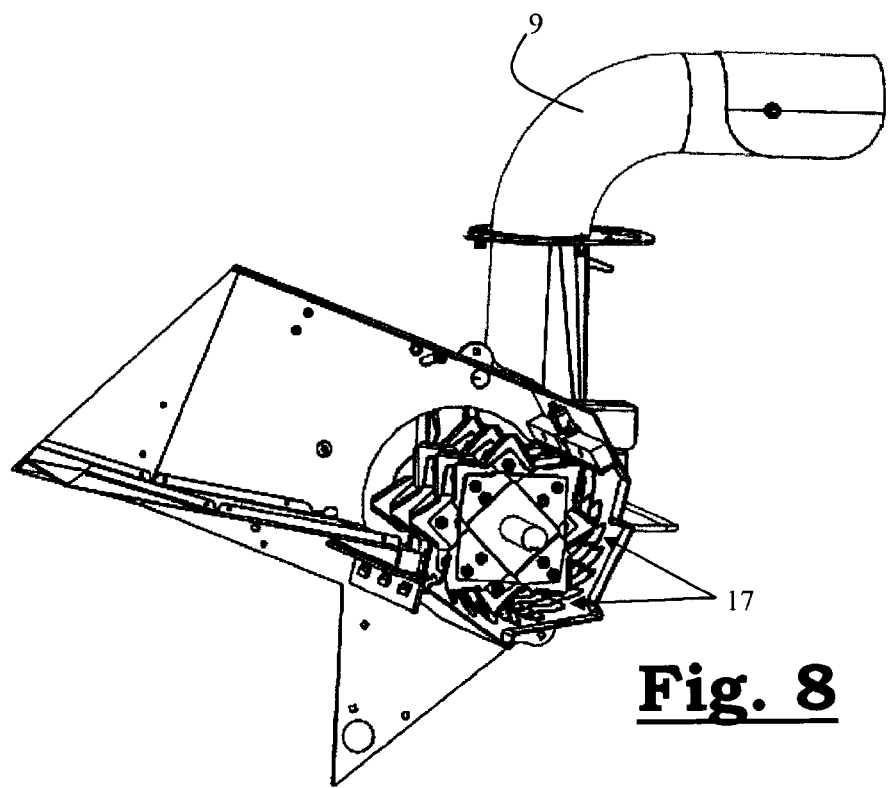
FIG. 8 shows a longitudinal section of an embodiment of the shredding chamber, the casing surface of which is provided with restraining elements.

FIG. 7 shows a possible embodiment in which a part of the casing has a stepped configuration, as a result of which the shreds moving along the casing bounce off each step and end up in the path of the cutting blades, thus ensuring they are cut more often. In order to prevent organic material with a tough fibre-like structure from winding itself up like a lead, in an embodiment of the invention, restraining means (17) in the form of, for example, protuberances, are provided on the casing wall which function as barbs. As illustrated in the example from FIG. 8, the protuberances are positioned such that they are situated between the cutting zones of the cutting blades so the cutting blades cannot hit them. The shape of the protuberance is like that of a hook which is directed with its hooking direction counter to the direction of rotation of the cutting blades. The tip of the protuberances protrudes inside the circle of rotation of the cutting blade tips. As a result thereof, fibre strings are gripped by the hook-shaped protuberances, after which they are cut by the cutting blades.

The shape of the cutting blades (13) is also chosen such that a labyrinth is created, as it were, for the shreds to find their way to the passage (4). The cutting blades (13) have an edge (cutting face (14)) at the front and a long back or wing at the rear (back face (16)). As the cutting blades (13) are fitted to discs, the cutting blades (not taking into account their angular offset) are more or less in the same plane. The shreds which, as a result of the suction force at the location of the passage (4), move towards the passage (4), in fact move in a direction transverse to the cutting blade discs. In other words, the shreds have to move through the space between two consecutive cutting blades (13) on the same cutting blade disc in order to reach the passage (4). By providing a longer wing (16) at the rear of the cutting blades (13), the space between the cutting blades of the same cutting blade group (12) becomes smaller, as a result of which it becomes more difficult for the shreds to pass in between, thus increasing the chance of them being cut more often. Due to the fact that the cutting blade groups (12) are also offset with respect to each other, a rotating labyrinth is also created, through which the shreds have to move in order to reach the passage (4).

A shred is created when it is cut off from a larger part of wood or green waste. The originally cut-off piece is then optionally further reduced in size inside the shredding chamber (2). Another element which can be used to influence the size of the shreds is to reduce the size of the 'initial shreds'. In order to achieve this, it has to be possible to introduce green waste in a controlled manner. The constellation of the cutting blades is an open system in which trimmings can easily enter, thus often resulting in the size of the initial shreds being large and irregular. Due to the special shape of the cutting blades (13) with an extended back (16), the trimmings are retained for much longer and can thus not penetrate so easily in the space between two successive cutting blades, resulting in a reduction in size of the piece which is initially cut off. This reduces the need for subsequent size reduction and controlled calibration in the shredding chamber (2).

As the shape and size of the shreds are only assessed once they have left the shredder, it is also possible to still carry out a further reduction in size in the fan chamber (6), as the fan (7) is also a rotating element in the shredder which can in turn help to reduce the size of the shreds still further. In a possible embodiment, cutting blades are also fitted to some blades (vanes) of the fan (7) which cut the shreds once more when they emerge from the shredding chamber (2). The shape of the passage (4) will therefore preferably not be a circle, but a shape with lobes or obstructions which retain the shreds so that they can be cut more easily.

As the shreds which are produced in the shredding chamber (2) and sucked off may also be relatively moist and are sometimes cut very finely, care has to be taken to prevent the fan and the fan chamber from becoming covered and clogged up. Therefore, the fan (7) has three functions: 1) the fan has to generate suction force to be able to suck the shreds out of the shredding chamber (2); 2) it has to ensure that the fan chamber (6) does not clog up with shreds; and finally 3) the fan (7) has to blow the shreds out of the fan chamber or hurl them away so that they are removed from the shredder (1).

When designing the fan blades, it is therefore important that these always adjoin the casing of the fan chamber (6) as closely as possible. This creates a brushing (cleaning) effect, as it were, which keeps the casing of the fan chamber (7) clean and prevents adhesion.

Figure 4:
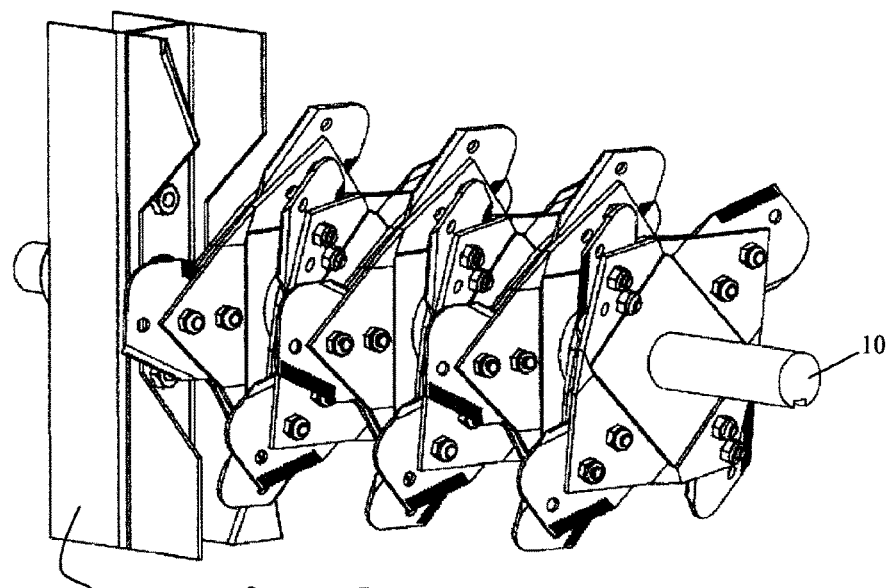
FIG. 4 shows an alternative embodiment of a shredder, in which the fan is configured as a vane-shaped element.
Figure 5:
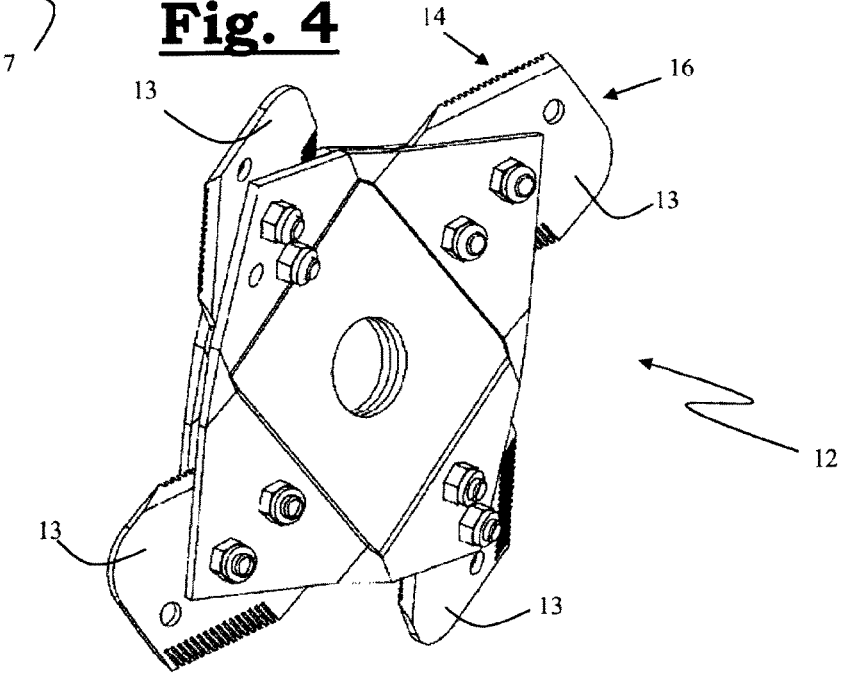
FIG. 5 shows a detail view of a cutting blade group, composed of four splitting blades.

As the fan (7) produces suction force and ejects shreds to the outside, one of the possible embodiments (see FIG. 4) of the fan may consist of a fan having two vane blades, which have better ejecting properties.

In order to be able to readily move the shredder (1), it is provided with a number of wheels, preferably two or four.

The invention claimed is:

1. A shredder (1) for comminuting organic material to form shreds, comprising one introduction funnel (5) for supplying organic material, a shredding chamber (2) provided with plural rotatable cutting blade groups (12) configured for shredding the supplied organic material into shreds and a fan (7) in a fan chamber (6) which is connected to the shredding chamber (2) via a centrally situated passage (4) configured for passing the shreds formed, said passage being provided between the shredding chamber and the fan chamber, the shredder further comprising a discharge opening (8) connected to the fan chamber, wherein the fan (7) is configured to generate a suction force which sucks the shreds out of the shredding chamber (2) via the passage (4), and wherein the fan removes the shreds from the fan chamber (6) via the discharge opening (8), the shredder further comprising a shaft (10) having a periphery on which at least two adjacent cutting blade groups of the plural rotatable cutting blade groups (12) are fixedly fitted and are rotatably arranged in front of an anvil (11), wherein said plural rotatable cutting blade groups (12) each comprise several splitting blades (13) which are intended for splitting supplied organic material substantially along a direction of introduction of the material, wherein said fan (7) is fitted on the same shaft (10) as that on which said cutting blade groups (12) are arranged and wherein the shredder (1) further comprises obstructions configured to counteract a shred-conveying airflow in a direction of the passage (4) to increase a residence time of the shreds, and wherein the several splitting blades (13) comprise bevels of cutting faces (14) sloping away from the passage (4) and the fan (7) as the splitting blades (13) contact the anvil (11), the bevels of the cutting faces (14) being configured such that the shreds formed by the several splitting blades (13) and the anvil (11) are flung in a direction away from the passage (4).

2. The shredder (1) according to claim 1, characterized in that the size of the passage (4) is adjustable and the shape of the passage (4) is adjustable.

3. The shredder (1) according to claim 1, characterized in that a center of passage (4) is situated on the shaft (10) of the plural rotatable cutting blade groups (12).

4. The shredder (1) according to claim 1, characterized in that the several splitting blades (13) within one cutting blade group of the plural rotatable cutting blade groups (12) are fitted on the shaft in a manner offset with respect to each other, and are configured such that projections of their cutting faces on the anvil (11) do not coincide and cover an entire width of the introduction funnel (5).

5. The shredder (1) according to claim 1, characterized in that the several splitting blades (13) of the plural rotatable cutting blade groups (12) which are fitted next to one another are situated offset opposite one another, and are configured to act on the supplied organic material at different points in time.

6. The shredder according to claim 1, characterized in that each of the several splitting blades (13) further comprises a back face (16) which is configured to slow down speed of introduction of the organic material into the shredding chamber.

7. The shredder (1) according to claim 1, further comprising a casing on the shredding chamber (2) having one or more guide elements configured to guide the shreds in the direction of the plural rotatable cutting blade groups (13).

8. The shredder (1) according to claim 1, further comprising a casing on the shredding chamber (2) comprising one or more hook-shaped restraining elements (17) configured to slow down movement of fibre strands.

9. The shredder (1) according to claim 1, characterized in that the fan (7) comprises a number of blades fitted on the shaft (10), in which one or more of the number of blades are provided with cutting elements configured for supplementary cutting of the shreds sucks-in.

10. The shredder (1) according to claim 1, characterized in that the fan (7) comprises two vane-shaped blades configured to adjoin a casing of the fan chamber and are adapted for cleaning the casing of the fan chamber during rotation of the fan.

11. The shredder (1) according to claim 1, characterized in that the shredder (1) comprises at most one introduction funnel (5) which is configured for manually supplying the organic material.

* * * * *